Patented Oct. 23, 1923.

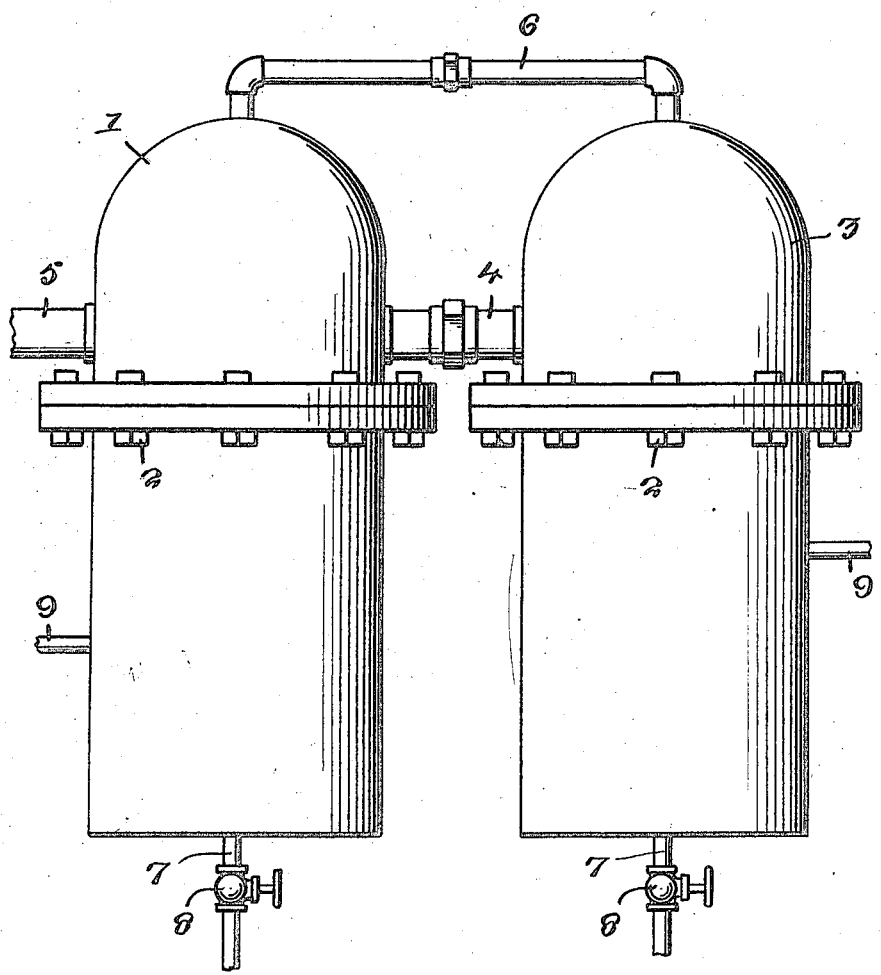

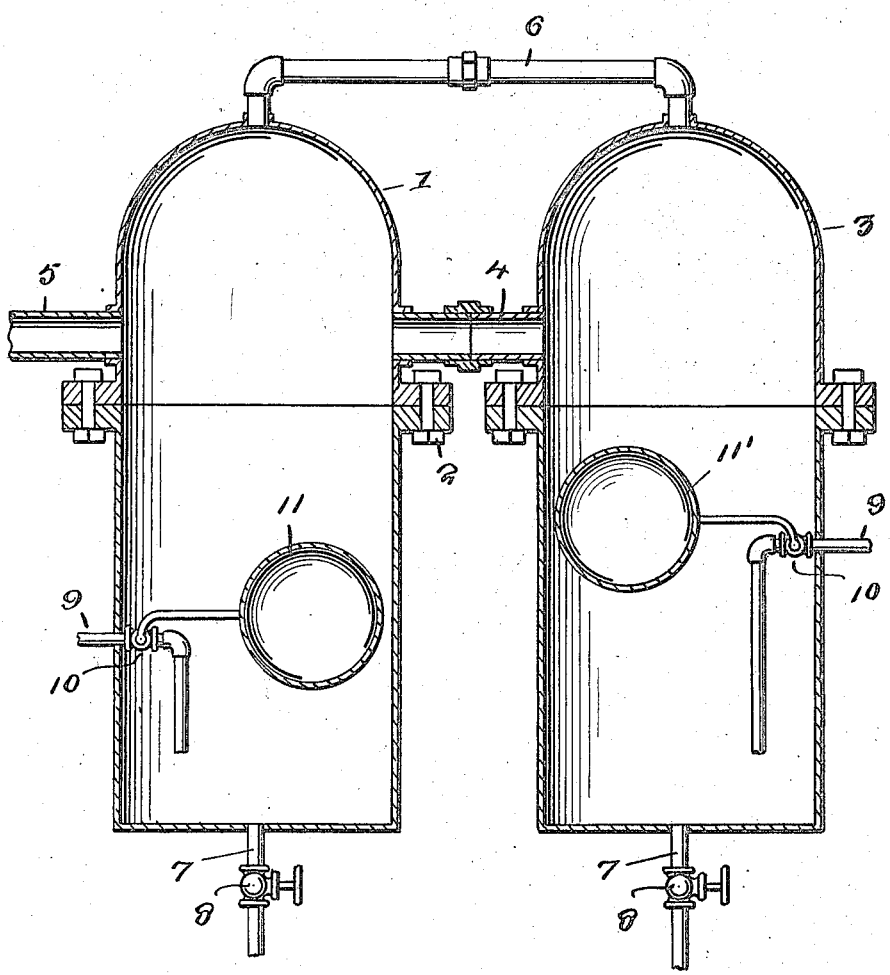

1,471,941

UNITED STATES PATENT OFFICE.

GEORGE H. BRUNHOEBER, OF PONCA CITY, OKLAHOMA, ASSIGNOR OF ONE-HALF TO JOHN FLETCHER, OF PONCA CITY, OKLAHOMA.

WATER TRAP.

Application filed April 3, 1920. Serial No. 371,174.

*To all whom it may concern:*

Be it known that I, GEORGE H. BRUNHOEBER, a citizen of the United States, residing at Ponca City, in the county of Kay and State of Oklahoma, have invented new and useful Improvements in Water Traps, of which the following is a specification.

This invention relates to a device for separating the water from gasoline and one of the objects of the invention is to provide a float device which is controlled by the water in the gasoline to operate to remove such water when the water reaches a certain level.

Another object of the invention is to provide a device embodying novel features of construction whereby the same may be utilized for collecting the water of condensation in steam systems and for automatically discharging the same when a certain amount has accumulated.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side elevation.

Figure 2 is a longitudinal sectional view.

In these vews 1 indicates a receptacle which is formed of an upper and lower part which are connected together by having their flanges perforated to receive the bolts 2. 3 indicates a second receptacle which is constructed similarly to the first one and which is connected to said first receptacle by the sectional pipe 4. The first receptacle 1 is provided with an inlet pipe 5 which is diametrically opposite the pipe 4. The tops of the two receptacles are connected together by the pipe 6. Each receptacle is provided with a drain pipe 7 at its lower end which is provided with a hand controlled valve 8. An outlet pipe 9 enters each receptacle and this pipe is provided with a downwardly extending portion which has its open end located adjacent the bottom of the receptacle. This pipe is provided with a valve 10 which is controlled by a float 11.

When the device is used for separating water from gasoline the float 11 in the first receptacle 1 is made of sufficient weight as not to be acted upon by the gasoline but will be raised by water. The float 11' in the other compartment is of such a nature as to be acted upon by the gasoline.

The gasoline will flow into the receptacle 1 by way of the pipe 5 and pass from the first receptacle through pipe 4 into the second receptacle. When it reaches a certain level in said second receptacle the float will raise to permit the gasoline to flow from the receptacle by way of the outlet pipe. If there should be water in the gasoline this would collect in the bottom of the first receptacle and when this water reached a certain level it will raise the float 11 to permit the water to drain through the pipe 9. The float will drop as soon as the water level is lowered thus closing the pipe and preventing the escape of gasoline. The pipe 6 will act as an overflow if the gasoline should flood the first receptacle and should rise to the top of the said receptacle for any reason the pipe 4 could not accommodate the same.

If the device is used for a water trap in a steam line the steam would pass into the first receptacle through pipe 5 and the outlet for the steam would be connected with either the top of said first receptacle or to the pipe 4, the second receptacle not being used. The water of condensation would drop to the bottom of the receptacle and when a sufficient amount had collected to raise the float this water would pass off through the piping 9.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A separating device of the character described comprising a pair of sectional receptacles, an inlet pipe entering the upper section of one of the receptacles, a pipe arranged diametrically opposite the inlet pipe and establishing communication between the receptacles, an outlet pipe arranged in opposing side walls of the lower section of each of the receptacles, a water controlled float actuated valve arranged in one of the outlet pipes and a gasoline controlled float actuated valve arranged in the other outlet pipe.

In testimony whereof I affix my signature.

GEORGE H. BRUNHOEBER.